Sept. 27, 1966 A. F. MANZ 3,275,797
WORK-IN-CIRCUIT METAL ARC WELDING
Filed May 13, 1964 4 Sheets-Sheet 1

INVENTOR.
AUGUST F. MANZ
BY
Barnwell P. King
ATTORNEY

INVENTOR.
AUGUST F. MANZ
BY
Barnwell P. King
ATTORNEY

INVENTOR.
AUGUST F. MANZ

United States Patent Office 3,275,797
Patented Sept. 27, 1966

3,275,797
WORK-IN-CIRCUIT METAL ARC WELDING
August F. Manz, Newark, N.J., assignor to Union Carbide Corporation, a corporation of New York
Filed May 13, 1964, Ser. No. 366,949
3 Claims. (Cl. 219—137)

This invention relates to power supply systems for metal arc welding, and more particularly to improvements in short-circuiting type metal-transfer arc welding.

Briefly the invention provides a novel method of and means for minimizing objectionable spatter occurring at each short circuit by reducing the short circuit current to a value that is less than the arc current in response to each short circuit.

One of the disadvantages of prior consumable electrode welding processes is the evolution of weld spatter. A significant portion of the spatter is produced during short circuit metal transfer by the electromagnetic pinch effects acting on the molten metal bridge between the electrode and workpiece. The electromagnetic pinch effect is a result of current flowing in the molten metal bridge. The spatter which is evolved accumulates on the weld torch and the workpiece and causes torch design and clean-up problems as well as increased costs of operation.

A great deal of effort has been applied to develop equipment which will operate in the presence of weld spatter. Means which would minimize the amount of spatter produced by the electromagnetic pinch effects during short circuit metal transfer therefore would simplify equipment design problems and reduce operating costs.

The main object of this invention is to provide efficient circuits for supplying power to the arc in short-circuiting type metal transfer arc welding, that substantially eliminate spatter by reducing the short circuiting metal transfer current to a value below that of the arc current during the period of each short circuit.

High-speed motion pictures show that in short circuiting type metal transfer, most of the spatter is generated during the short-circuiting metal transfer period. The spatter evolved is due to the action of electromagnetic pinch forces resulting from the current flowing in the liquid metal bridge. When the pinch force is large and the rate of application of the pinch force is rapid, a great deal of spatter is created. The series power supplies provide satisfactory means for controlling the amount of pinch and rate of pinch for short circuit metal transfer with currents below 300 amperes.

When the normal (steady state) welding current exceeds 300 amperes, however, spatter is produced because of too great a pinch effect and it cannot be significantly reduced by control of the rate of pinch. The 300-ampere level is an arbitrary choice. It will vary as much as 50 amperes depending upon the welding conditions, materials, etc. However, there is a current above which spatter is produced solely due to the magnitude of the pinch force and which cannot be reduced by control of the rate of application of pinch forces.

When welding with available power sources, a short-circuit metal transfer generally causes an increase in the current magnitude above arc current. When welding with arc currents greater than 300 amperes, the current at short circuit is more than adequate to produce explosive vaporization of the metal bridge and produce spatter. Spatter would be eliminated if the pinch force were reduced to a value below that produced at the 300-ampere level. (Recall that the 300-ampere level has been arbitrarily selected and is not a rigid requirement.)

The inherent characteristic of prior welding power sources prevent the short circuit current from being rapidly reduced below that of the normal arc operating level to eliminate spatter. Consequently, spatter will inevitably be produced with such welding power sources when operating at relatively high current levels.

The present invention provides power source systems which selectively control the arc current operating level and the short circuit current operating level to thereby reduce spatter to a minimum for all short-circuiting types of metal transfer. Such power source can be adjusted to provide a short circuit current of less than 300 amperes while the arc current is of a greater or lesser magnitude.

According to the invention, there is provided a power supply system for energizing short-circuiting type metal transfer arc welding with a consumable electrode and work-in-series, which comprises, in combination, a polyphase power supply circuit having a D.C. output circuit for connection to the welding arc via the consumable electrode and the work-in-circuit, and a spatter reducer unit connected in such circuit for selectively controlling the output characteristic of such circuit so that the maximum value of current at each metal transfer short circuit is less than that of the arc current between such transfers, whereby objectionable spatter is minimized.

Figure 1:
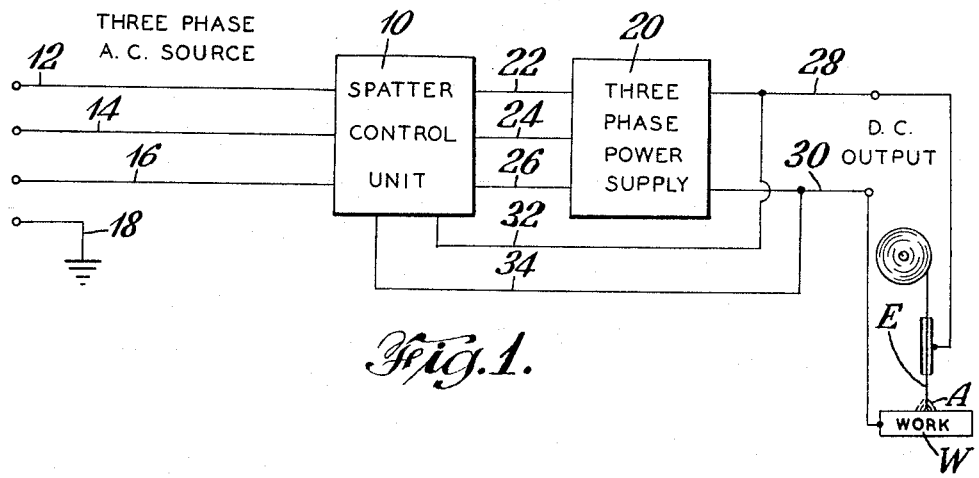
FIGURES 1–5 are simplified circuit diagrams of welding arc power supply circuits embodying the invention.

As shown in FIGURE 1, the input of spatter control unit 10 is connected to a three phase A.C. power source by leads 12, 14 and 16, such source having a ground lead 18. The output of unit 10 is, in turn, connected to a three phase power supply 20 by leads 22, 24 and 26. The D.C. output of supply 20 is connected by leads 28 and 30 to welding arc A between a consumable electrode (wire) E and work W, and by feedback leads 32 and 34 to the spatter control unit 10.

Figure 2:
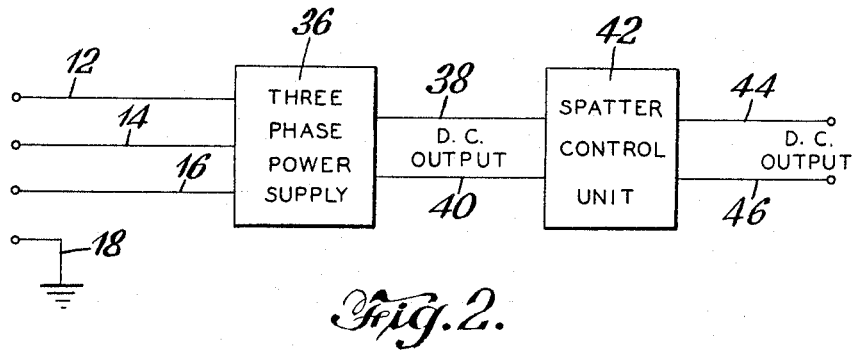
Figure 10:
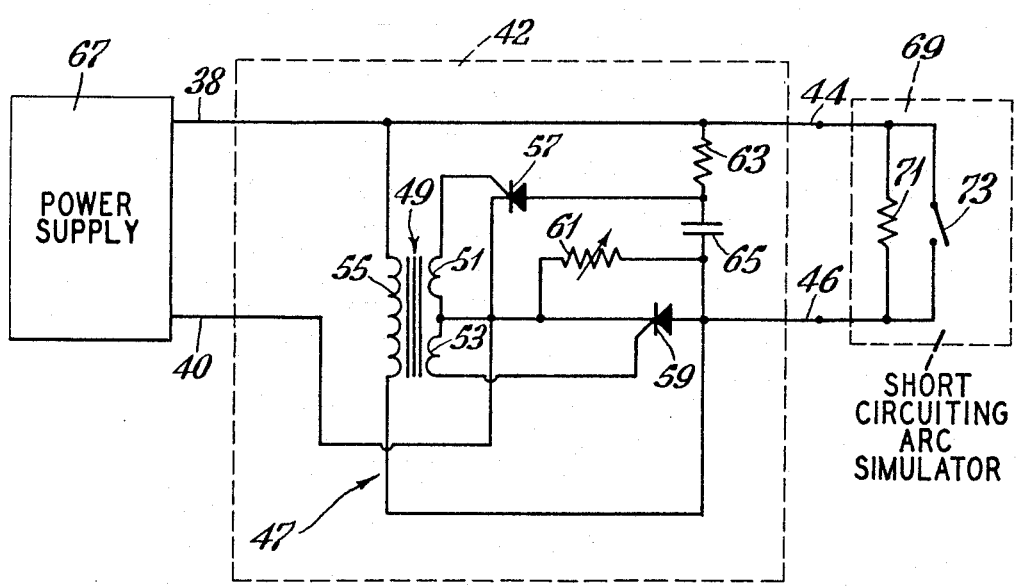
FIGURE 10 is a circuit diagram of the spatter control unit shown in FIGURE 2.

In FIGURE 2, the input of three phase power supply 36 is connected directly to the three phase A.C. source by leads 12, 14 and 16. The D.C. output is connected by leads 38 and 40 to spatter control unit 42, and the D.C. output leads 44 and 46 are connected to the welding arc through an electrode (wire) and the work in the welding circuit. Such spatter control unit 42, FIGURE 10, comprises by way of example an automatic switching circuit 47 consisting of a pulse transformer 49 having two output windings 51 and 53, and a single primary winding 55. Silicon controlled rectifiers 57 and 59 are connected so as to be controlled by the output of such windings 51 and 53. An adjustable resistor 61 is connected to bypass current from silicon controlled rectifier 59. A resistor 63 is connected to output lead 44 and to one end of a commutating condenser 65, the other end of which is connected to output lead 46.

To explain the operation of circuit 47, a power supply such as a battery 67 is connected to D.C. leads 38 and 40; and output leads 44 and 46 are connected to a short-circuiting arc simulator 69 comprising a load resistor 71 and a short-circuiting switch 73. When battery 67 provides current initially to the load resistor 71 through resistor 61, a pulse in transformer 49 is created by virtue of the rising voltage across resistor 71. Such pulse produces an output signal from winding 53 which turns on silicon control rectifier 59, by-passing resistor 61, thereby causing the load current in resistor 71 to reach a normal steady state condition. Condenser 65 charges through resistor 63 to the voltage of power supply 67. Silicon control rectifier 57 remains in an "OFF" state because the pulse produced in output winding 51 is opposite in polarity to that needed to turn such silicon control rectifier 57 "ON." The normal load current is equal to the output voltage of battery 67 divided by load resistance 71. When shorting switch 73 is closed, simulating a load short-circuit, the voltage across load resistor 71 and winding 55 of transformer 49 decreases rapidly to zero, creating output pulses opposite to their previous polarity, thereby turning on silicon control rectifier 57. When silicon control rectifier 57 is turned on, condenser 65 discharges through silicon control rectifier 59 and its parallel resistor 61. The reverse current through silicon control rectifier 59, due to condenser 65, then turns silicon control rectifier 59 off and causes resistor 61 to be added into the circuit.

The current through switch 73 is now equal to the voltage of battery 67 divided by resistance 61, which is selected to regulate current to a level less than that of the normal load current. When switch 73 is returned to its normally open position, silicon control rectifier 59 is turned on again, and the sequence can repeat itself.

The resistance of coil 55 is selected to be higher than the load resistance 71, in order to minimize its loading effect on the total system current. If the voltage across and current through leads 44 and 46 are plotted on a magnitude vs. time scale they will look like FIGURE 9b. At level 75, the load current is normal and silicon control rectifier 59 is on, at level 77 the current is low because silicon control rectifier 59 is off. The switch 73 simulates the action of a short circuiting welding arc, or a load which has gone to short circuit conditions.

Figure 3:
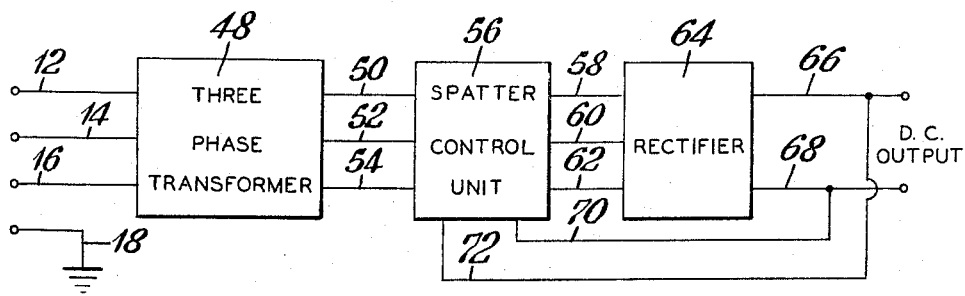

As shown in FIGURE 3, input leads 12, 14 and 16 are connected to three phase transformers 48, the output of which, in turn, is connected by leads 50, 52 and 54 to spatter control unit 56. Output of the latter is connected by leads 58, 60 and 62 to rectifier 64 having D.C. output leads 66 and 68. Feedback leads 70 and 72 connect the latter to control unit 56.

Figure 4:
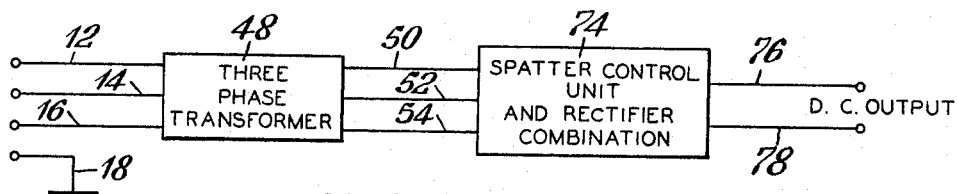

In FIGURE 4 output leads 50, 52 and 54 from transformer 48 are connected to spatter control unit and rectifier combination 74 having D.C. output leads 76 and 78.

Figure 5:
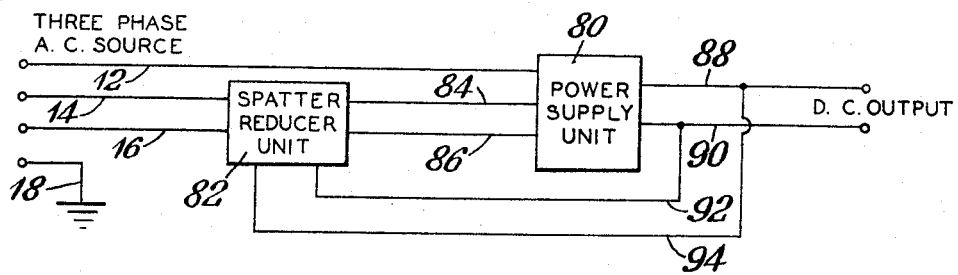

As shown in FIGURE 5, lead 12 of the three phase A.C. source is connected directly to the input of power supply unit 80, while leads 14 and 16 are connected to the input of spatter reducer unit 82. The latter is connected by leads 84 and 86 to such unit 82, and the D.C. output leads 88 and 90 of the latter are connected to the spatter control unit by feedback leads 92 and 94.

Figure 6:
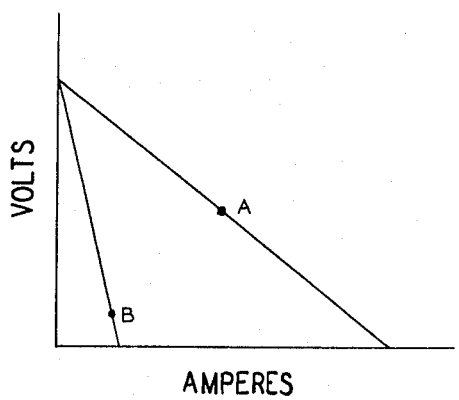
FIGURES 6–8 are V–A characteristic curves illustrative of the invention.

By way of example, the volt-ampere characteristic of one version of a suitable power source system of the invention is shown in FIGURE 6. With switching means operated by arc or short circuit voltage, the power source operates on curve A, or curve B. Curve A is selected to produce the desired arc condition. Curve B is used to select and produce the required short circuit condition for the reduction of spatter.

Figure 7:
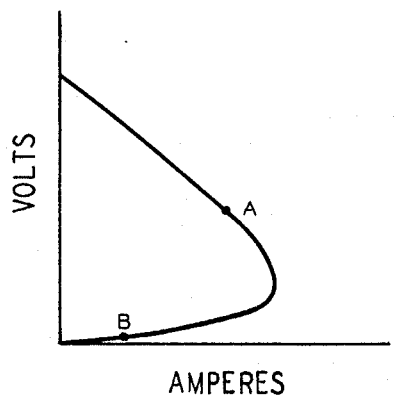

The volt-ampere characteristic of another type of power source system is shown in FIGURE 7. Note that the characteristic curve reverses so that the arc operating point A is at a higher current level than the short circuit current operating point B. The transition from point A to point B must occur at a very high rate.

Figure 8:
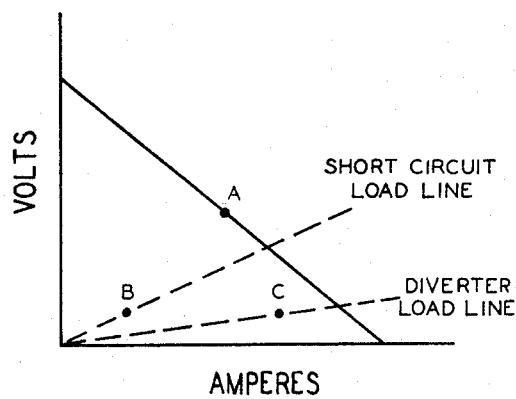

The volt-ampere characteristic of still another type power source is shown in FIGURE 8, where the arc operating point is A and the short circuit current through the arc zone is B. In this system, the remainder of the system short circuit current (C) is diverted through a path parallel to the arc zone by the switching device.

Figure 9A:
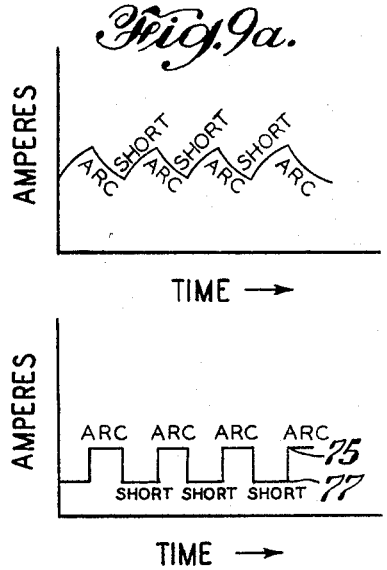
FIGURES 9a and 9b are typical arc current vs. time characteristic curves of prior arc power sources (a) and the invention (b)
Figure 9B:

Each of the preceding types of power sources will produce a current versus time characteristic similar to that shown in FIGURE 9b. FIGURE 9a shows a typical short circuit metal transfer current versus time characteristic with prior commercial power supplies. Note that the inventive power source inverts the short circuit arc current relationship by reducing the current during short circuit metal transfer to a level below the critical current (300 amperes). This source of power virtually eliminates objectionable spatter due to high electromagnetic pinch effects during the metal transfer process.

A miniature (low current) version of a power source which produced the characteristic shown in FIGURE 6 was made with silicon controlled rectifiers. An artificial arc voltage and an artificial short circuit voltage were used as signals in the silicon controlled rectifiers circuit to switch in and out a series connected current-limiting resistor in the power source circuit. The system produced a current versus time characteristic similar to the one shown in FIGURE 9b. The silicon controlled rectifiers were chosen as the active switching elements because of their high speeds of response. The satisfactory operation of the silicon controlled rectifier circuit and the resulting current versus time characteristic indicate that it is possible to produce a power source which will automatically produce a lower short circuit current than arcing current. It follows that a large scale version of the inventive power source will also produce such a current versus time characteristic, resulting in the elimination of weld spatter due to short circuit metal transfer.

What is claimed is:

1. Short-circuiting type metal transfer arc welding which comprises energizing a short-circuiting type metal transfer arc between a consumable metal electrode and work to be welded while feeding such electrode toward the work, with welding power derived from a source having a volt-ampere characteristic such that the maximum value of current at each short circuit transfer is less than the arc current between such transfers, whereby objectionable spatter is minimized.

2. In the art of metal arc welding in which a short-circuiting type of arc is maintained between a wire electrode and the work in circuit, the method of minimizing objectionable spatter occurring during each short circuit, which comprises automatically reducing the short circuit current to a value that is less than the arc current in response to each of such short circuits.

3. A power supply system for energizing short-circuiting type metal transfer arc welding with a consumable electrode and work-in-series, which comprises, in combination, a polyphase power supply circuit having a D.C. output circuit for connection to the welding arc via the consumable electrode and the work-in-circuit, and a spatter reducer unit connected in such circuit for selectively controlling the output characteristic of such circuit so that the maximum value of current at each metal transfer short circuit is less than that of the arc current between such transfers, whereby objectionable spatter is minimized.

References Cited by the Examiner
UNITED STATES PATENTS

| | | | |
|---|---|---|---|
| 2,886,696 | 5/1959 | Tuthill et al. | 219—137 |
| 3,113,245 | 12/1963 | Hoffman | 317—9 |
| 3,122,629 | 2/1964 | Manz | 219—74 |
| 3,125,671 | 3/1964 | Manz | 219—131 |
| 3,180,969 | 4/1965 | Williams | 219—137 |

References Cited by the Applicant
UNITED STATES PATENTS

| | | |
|---|---|---|
| 3,054,884 | 9/1962 | Manz et al. |

ANTHONY BARTIS, *Acting Primary Examiner.*

RICHARD M. WOOD, *Examiner.*